US011250735B2

(12) United States Patent
Zhu (10) Patent No.: US 11,250,735 B2
(45) Date of Patent: Feb. 15, 2022

(54) FLEXIBLE DISPLAY

(71) Applicant: Wuhan China Star Optoelectronics Semiconductor Display Technology Co., Ltd., Wuhan (CN)

(72) Inventor: Cuilin Zhu, Wuhan (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 213 days.

(21) Appl. No.: 16/603,590

(22) PCT Filed: May 7, 2019

(86) PCT No.: PCT/CN2019/085745
§ 371 (c)(1),
(2) Date: Oct. 8, 2019

(87) PCT Pub. No.: WO2020/215367
PCT Pub. Date: Oct. 29, 2020

(65) Prior Publication Data
US 2021/0280093 A1    Sep. 9, 2021

(30) Foreign Application Priority Data

Apr. 22, 2019   (CN) .......................... 201910321510.1

(51) Int. Cl.
*G09F 9/30*       (2006.01)
*G06F 3/041*      (2006.01)

(52) U.S. Cl.
CPC ............ *G09F 9/301* (2013.01); *G06F 3/0412* (2013.01)

(58) Field of Classification Search
CPC ...... G09F 9/301; G06F 3/0412; G06F 1/1652; G06F 2203/04102
See application file for complete search history.

(56) References Cited

U.S. PATENT DOCUMENTS

| 2016/0172428 | A1* | 6/2016 | Song ................... H01L 27/3276 |
| | | | 257/99 |
| 2016/0179229 | A1* | 6/2016 | Ahn ..................... G06F 3/04164 |
| | | | 345/173 |
| 2018/0019418 | A1 | 1/2018 | Sonoda et al. |
| 2018/0062094 | A1* | 3/2018 | Kwon ................. H01L 51/5284 |
| 2018/0180911 | A1 | 6/2018 | Odaka |
| 2018/0182829 | A1 | 6/2018 | Shin et al. |
| 2019/0067606 | A1* | 2/2019 | Han .................... H01L 51/5237 |
| 2019/0355919 | A1* | 11/2019 | Lu ........................... B32B 17/06 |
| 2020/0174526 | A1* | 6/2020 | Jeong ..................... G09F 9/301 |

(Continued)

FOREIGN PATENT DOCUMENTS

| CN | 106910429 | 6/2017 |
| CN | 108389886 | 6/2018 |

(Continued)

*Primary Examiner* — Joe H Cheng (57) ABSTRACT

A flexible display is provided and includes a flexible panel and a backplane disposed on the flexible panel. The flexible panel includes a display section, a bonding section, and a bending section between the display section and the bonding section. The bonding section is connected to the backplane through a bonding layer in response to the bending section being bent and the bonding section reaching a back side of the backplane. The bonding layer includes at least three layers of adhesive layers.

18 Claims, 5 Drawing Sheets

(56) References Cited

U.S. PATENT DOCUMENTS

2020/0203641 A1* 6/2020 Lee .................. G02F 1/133305
2021/0086469 A1* 3/2021 Cosgrove ................ B32B 3/085

FOREIGN PATENT DOCUMENTS

| CN | 108281387 A | * | 7/2018 | ......... H01L 51/0097 |
|----|----|----|----|----|
| CN | 108628500 | | 10/2018 | |
| CN | 108628500 A | * | 10/2018 | |
| CN | 108877519 | | 11/2018 | |
| CN | 108877519 A | * | 11/2018 | |
| CN | 108986670 | | 12/2018 | |
| CN | 108986670 A | * | 12/2018 | ............. H05K 1/147 |
| CN | 109300401 A | * | 2/2019 | |
| WO | WO-2020155396 A1 | * | 8/2020 | |

* cited by examiner

FIG. 1

(PRIOR ART)

FLEXIBLE DISPLAY

RELATED APPLICATIONS

This application is a National Phase of PCT Patent Application No. PCT/CN2019/085745 having International filing date of May 7, 2019, which claims the benefit of priority of Chinese Patent Application No. 201910321510.1 filed on Apr. 22, 2019. The contents of the above applications are all incorporated by reference as if fully set forth herein in their entirety.

FIELD AND BACKGROUND OF THE INVENTION

The present disclosure relates to the field of display technologies, and in particular, to a flexible display.

In modern communication industries, a market demand for mobile phones, televisions, tablets, notebooks, digital cameras, and other products is increasing. Various display devices are also being developed in a bendable manner. In a manufacture of flexible full-screen display modules, it is necessary to use bending process.

Figure 1:
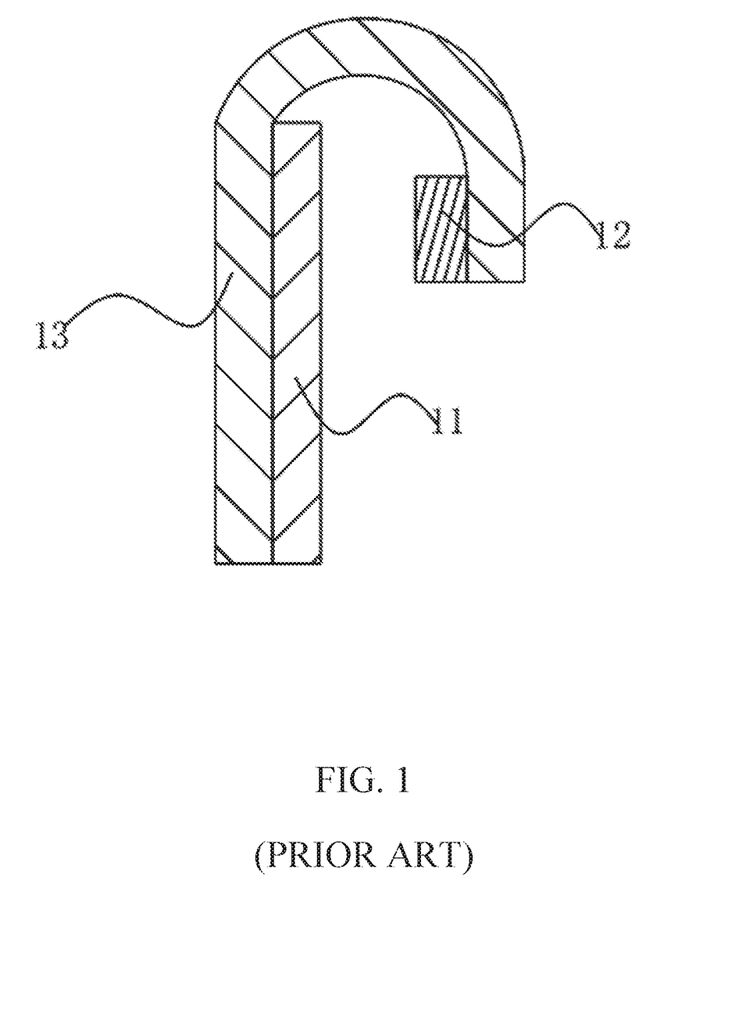
FIG. 1 is a structure diagram of a flexible display device in the prior art.

As shown in FIG. 1, in a conventional flexible display device, a first backplane 11 and a second backplane 12 of a the display panel 13 are designed in two parts, and the first backplane 11 and the second backplane 12 are bent together with the display panel 13. The first backplane 11 is adhered to the second backplane 12 by a curing adhesive. After the bending process, the two backplanes are prone to misalignment, resulting in poor bending arc shaped and reduced product quality.

SUMMARY OF THE INVENTION

In the conventional flexible display, after the bending process, the two backplanes are prone to misalignment, resulting in poor bending arc shaped and reduced product quality. The present disclosure can solve the above problems.

A flexible display includes:

a flexible panel including a display section, a bonding section, and a bending section between the display section and the bonding section; and a backplane disposed on the flexible panel;

wherein the bonding section is connected to the backplane through a bonding layer in response to the bending section being bent and the bonding section reaching a back side of the backplane, and the bonding layer includes at least three layers of adhesive layers, and a protective layer is fixedly disposed on the back side of the backplane, and an enhancement layer covering the bending section is disposed on the flexible panel.

Furthermore, the bonding layer includes a first adhesive layer, a second adhesive layer, and a third adhesive layer which are disposed layer by layer, and the second adhesive layer includes a thermosensitive adhesive layer or a photosensitive adhesive layer.

Furthermore, the second adhesive layer including a first carrier, a second carrier opposite to the first carrier, and a thermosensitive adhesive or a photosensitive adhesive between the first carrier and the second carrier, and the first carrier is disposed on the first adhesive layer, and the second carrier is disposed on the third adhesive layer.

Furthermore, the first adhesive layer and the third adhesive layer include pressure-sensitive adhesive layers.

Furthermore, the bonding layer is disposed below the backplane in response to the flexible panel that is in an unbent state.

Furthermore, the bonding layer is disposed on the bonding section in response to the flexible panel that is in an unbent state.

Furthermore, the enhancement layer includes a flexible adhesive layer.

Furthermore, the flexible display further includes:

an encapsulation layer disposed on the flexible panel;

a touch layer disposed over the encapsulation layer;

a polarizer disposed over the touch layer; and an encapsulating cover layer disposed on the polarizer;

wherein the touch layer is electrically connected to the flexible panel through a flexible printed circuit board.

A flexible display includes:

a flexible panel including a display section, a bonding section, and a bending section between the display section and the bonding section; and a backplane disposed on the flexible panel;

wherein the bonding section is connected to the backplane through a bonding layer in response to the bending section being bent and the bonding section reaching a back side of the backplane, and the bonding layer includes at least three layers of adhesive layers.

Furthermore, the bonding layer includes a first adhesive layer, a second adhesive layer, and a third adhesive layer which are disposed layer by layer, and the second adhesive layer includes a thermosensitive adhesive layer or a photosensitive adhesive layer.

Furthermore, the second adhesive layer including a first carrier, a second carrier opposite to the first carrier, and a thermosensitive adhesive or a photosensitive adhesive between the first carrier and the second carrier, and the first carrier is disposed on the first adhesive layer, and the second carrier is disposed on the third adhesive layer.

Furthermore, the first adhesive layer and the third adhesive layer include pressure-sensitive adhesive layers.

Furthermore, the bonding layer is disposed below the backplane in response to the flexible panel that is in an unbent state.

Furthermore, the bonding layer is disposed on the bonding section in response to the flexible panel that is in an unbent state.

Furthermore, a protective layer is fixedly disposed on the back side of the backplane.

Furthermore, an enhancement layer covering the bending section is disposed on the flexible panel.

Furthermore, the enhancement layer includes a flexible adhesive layer.

Furthermore, the flexible display further includes:

an encapsulation layer disposed on the flexible panel;

a touch layer disposed over the encapsulation layer;

a polarizer disposed over the touch layer; and an encapsulating cover layer disposed on the polarizer;

wherein the touch layer is electrically connected to the flexible panel through a flexible printed circuit board.

After bending the bonding section to the back side of the backplane, the backplane and the bonding section are adhered by the bonding layer formed by a plurality of adhesive layers which are disposed layer by layer. At the same time, the second adhesive layer in the bonding layer is in an uncured state in a natural environment and has good fluidity. Even if a connection position of the bonding section and the backplane is inaccurate, a bending arc shaped is poor, and the first adhesive layer and the third adhesive layer located at upper and lower layers of the bonding layer may be misaligned after being pressed, so that the position of the bonding section can be moved and adjusted for misalignment compensation, so that the bending arc shaped is good and a product quality is improved.

BRIEF DESCRIPTION OF THE SEVERAL VIEWS OF THE DRAWINGS

In order to more clearly illustrate technical solutions in embodiments or the prior art, drawings to be used in descriptions of the embodiments or the prior art will be briefly described below. Apparently, the drawings in the following description are merely some embodiments of the disclosure. Other drawings may also be obtained from those of ordinary skill in the art in view of the drawings.

REFERENCE NUMERALS 11, first backplane; 12, second backplane; 13, display panel;
20, flexible panel; 21, display section; 22, bending section; 23, bonding section; 30, backplane; 40, encapsulation layer; 50, touch layer; 60, polarizer; 70, encapsulating cover layer; 80, bonding layer; 81, first adhesive layer; 82, second adhesive layer; 821, first carrier; 822, second carrier; 83, third adhesive layer; 90, protective layer; 101, enhancement layer; 102, first optical adhesive layer; 103, second optical adhesive layer; 104, flexible printed circuit board

DESCRIPTION OF SPECIFIC EMBODIMENTS OF THE INVENTION

The following description of the embodiments with reference to the accompanying drawings is used to illustrate particular embodiments of the present disclosure. The directional terms referred in the present disclosure, such as "upper", "lower", "front", "after", "left", "right", "inner", "outer", "side surface", etc. are only directions with regard to the accompanying drawings. Therefore, the directional terms used for describing and illustrating the present disclosure are not intended to limit the present disclosure. In the drawings, units with similar structures are indicated by the same reference number.

In the prior art flexible display, after a bending process, two backplanes are prone to misalignment, resulting in poor bending arc shaped and reduced product quality. The present disclosure can solve the above problems.

Figure 2:
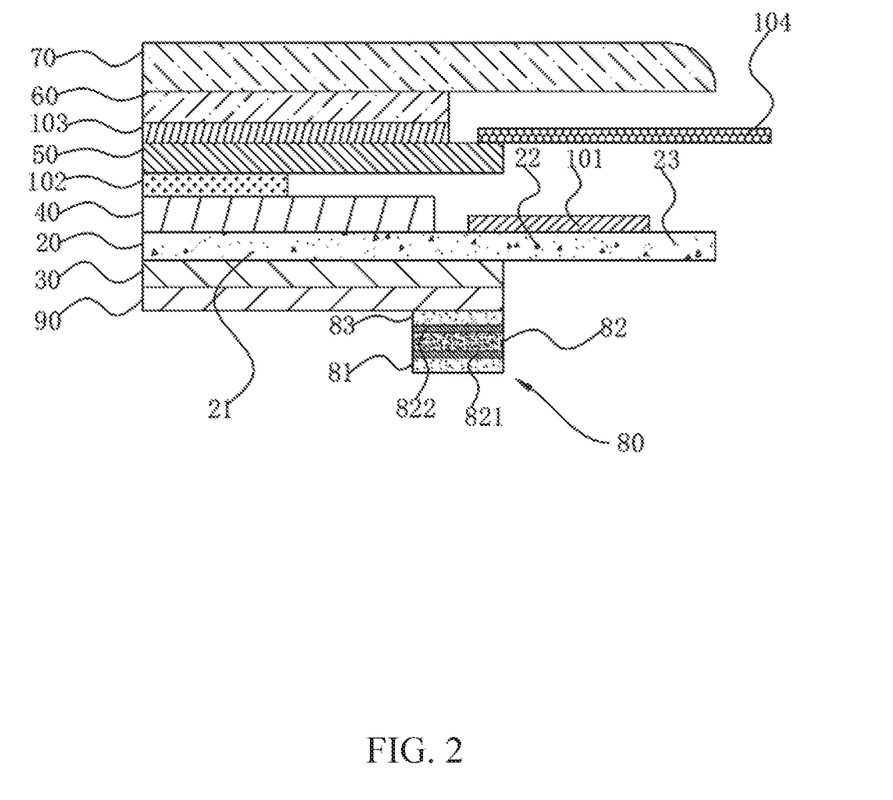
FIG. 2 is a structure diagram of a flexible panel in an unbent state of one embodiment of the present disclosure.

As shown in FIG. 2, a flexible display includes a flexible panel 20, a backplane 30 disposed below the flexible panel 20, an encapsulation layer 40 disposed above the flexible panel 20, a touch layer 50 disposed over the encapsulation layer 40, a polarizer 60 disposed over the touch layer 50, and an encapsulating cover layer disposed on the polarizer 60.

The flexible panel 20 includes a display section 21, a bonding section 23, and a bending section 22 between the display section 21 and the bonding section 23. When a bending process is performed, by bending the bending section 22, the bonding section 23 of the flexible panel 20 reaches a back side of the backplane 30, and the bonding section 23 is connected to the backplane 30.

The bonding section 23 is connected to the backplane 30 through a bonding layer 80 in response to the bending section 22 being bent and the bonding section 23 reaching the back side of the backplane 30. The bonding layer 80 includes at least three layers of adhesive layers which are disposed layer by layer.

Figure 3:
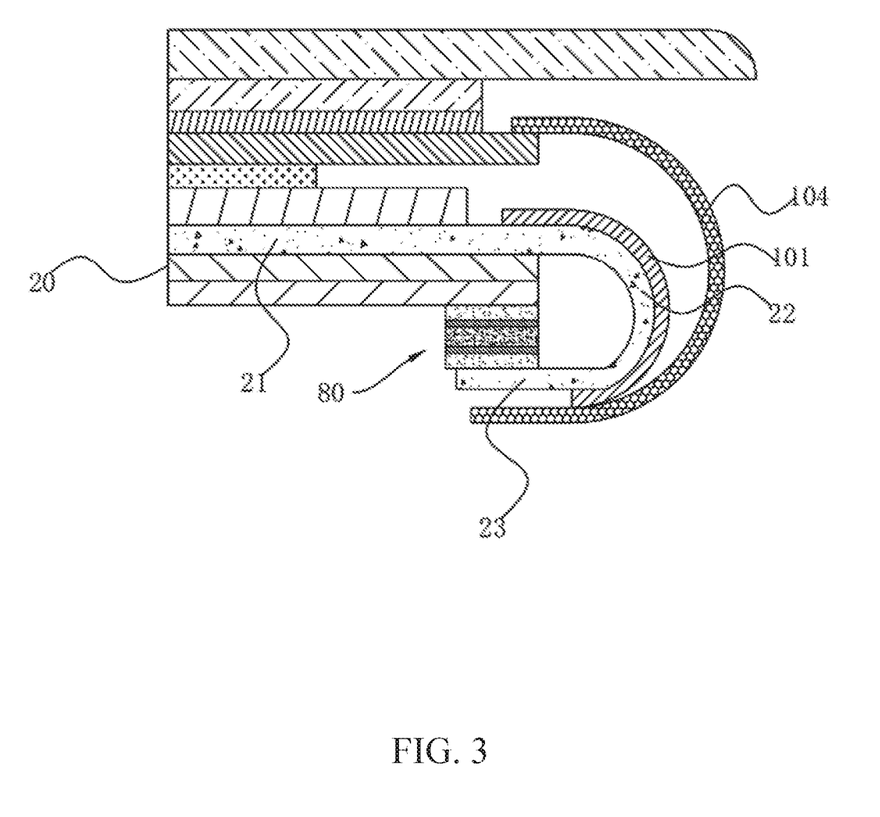
FIG. 3 is a structure diagram showing the flexible display with poor bending arc shaped of the present disclosure.
Figure 4:
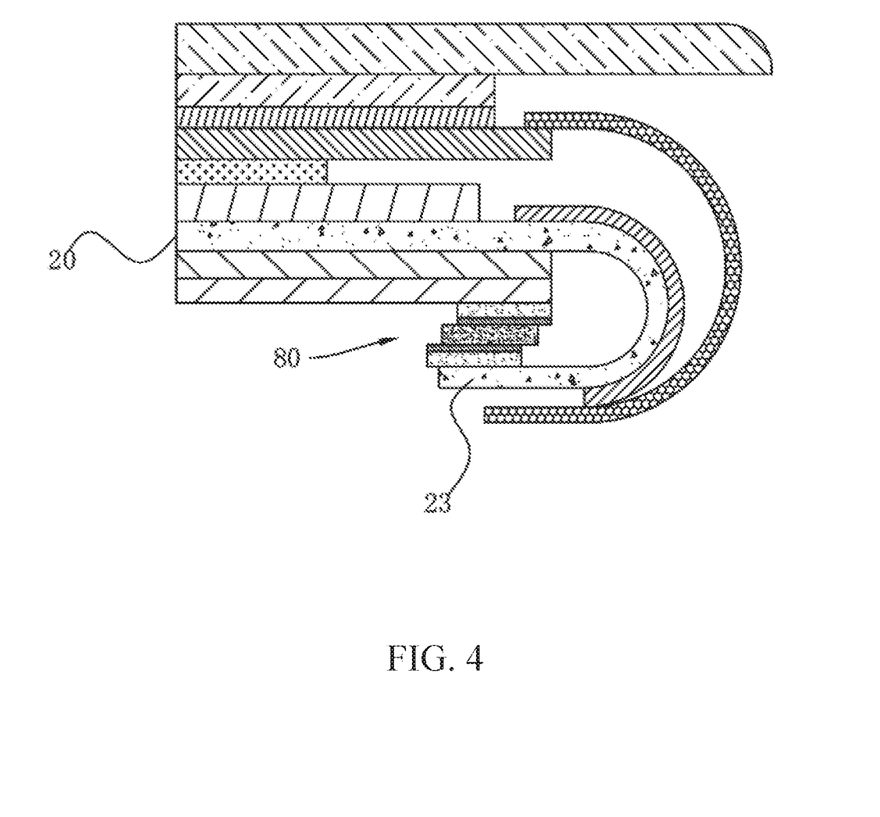
FIG. 4 is a structure diagram showing the flexible display with good bending arc shaped of the present disclosure.

Referring to FIG. 3 and FIG. 4, the bonding section 23 is bent to the back side of the backplane 30. The backplane 30 and the bonding section 23 are adhered by the bonding layer 80 formed of a plurality of layers of adhesive layers. Even if a connection position of the bonding section 23 and the backplane 30 is inaccurate, a bending arc shape formed by the bending section 22 is poor (as shown in FIG. 3), the adhesive layer in a middle of the bonding layer 80 is not yet cured, and the adhesive layers at upper and lower layers of the bonding layer 80 may be misaligned after being pressed, so that the position of the bonding section 23 can be moved and adjusted for misalignment compensation, so that the bending arc shaped is good (as shown in FIG. 4) and a product quality is improved.

In one embodiment, when the display panel that is in an unbent state, the bonding layer 80 is disposed below the backplane 30.

Specifically, the bonding layer 80 includes a first adhesive layer 81, a second adhesive layer 82, and a third adhesive layer 83 which are disposed layer by layer. The second adhesive layer 82 is a thermosensitive adhesive layer or a photosensitive adhesive layer.

It can be known to those skilled in the art that the thermosensitive adhesive layer formed of thermosensitive adhesive has good fluidity at normal temperature and is cured after heating, and the photosensitive adhesive layer formed of photosensitive adhesive has good fluidity at normal temperature and without being subjected to ultraviolet light irradiation. After curing by ultraviolet light, the second adhesive layer 82 is formed by the thermosensitive adhesive or the photosensitive adhesive, so that the position of the bonding section 23 is moved and adjusted when the bonding section 23 is connected with the backplane 30 to optimize the bending arc shape.

The second adhesive layer 82 includes a first carrier 821, a second carrier 822 opposite to the first carrier 821, and a thermosensitive adhesive or a photosensitive adhesive between the first carrier 821 and the second carrier 822. The first carrier 821 is disposed on the first adhesive layer 81, and the second carrier 822 is disposed on the third adhesive layer 83.

In one embodiment, the first adhesive layer 81 and the third adhesive layer 83 are pressure-sensitive adhesive layers. When the bonding section 23 is connected to the backplane 30 through the bonding layer 80, the first adhesive layer 81 and the bonding section 23 are adhered.

It should be noted that, as is known to those skilled in the art, the pressure-sensitive adhesive layer formed from the pressure-sensitive adhesive has good fluidity at normal temperature and under a small pressure, thereby facilitating adhering of the first adhesive layer 81 and the bonding section 23. When the pressure-sensitive adhesive layer is subjected to a large pressure, the pressure-sensitive adhesive layer has highly viscous, thereby preventing the bonding section 23 from being separated from the backplane 30.

It should be noted that, in one embodiment, formation materials of the first adhesive layer 81 and the third adhesive layer 83 may also be the same as the second adhesive layer 82.

Specifically, a first optical adhesive layer 102 is disposed between the encapsulation layer 40 and the touch layer 50, and the touch layer 50 is fixedly connected to the encapsulation layer 40 by the first optical adhesive layer 102.

Specifically, a second optical adhesive layer 103 is disposed between the polarizer 60 and the encapsulating cover layer 70, and the encapsulating cover layer 70 is fixedly connected to the polarizer 60 through the second optical adhesive layer 103.

Specifically, the touch layer 50 is electrically connected to the flexible panel 20 through a flexible printed circuit board 104. A portion of the flexible printed circuit board 104 is bent to the back side of the backplane 30 and electrically connected to the bonding section 23.

Specifically, a protective layer 90 is further disposed on the back side of the backplane 30.

Specifically, the flexible panel 20 is provided with an enhancement layer 101 covering the extending section 22, and the enhancement layer 101 is a flexible adhesive layer.

The enhancement layer 41 is used to improve a bendability of the bending section 22 to prevent cracking at the bending section 22 during the bending process.

In one embodiment, a formation material of the enhancement layer 101 includes a photosensitive adhesive.

Figure 5:
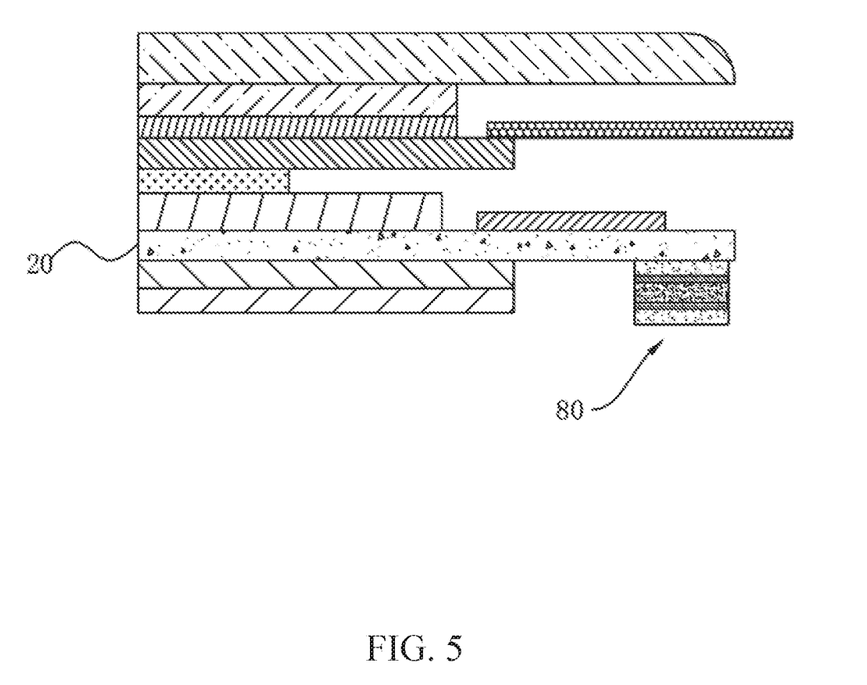
FIG. 5 is a structure diagram of a flexible panel in an unbent state of another embodiment of the present disclosure.

As shown in FIG. 5, in another embodiment, when the flexible panel 20 that is in an unbent state, the bonding layer 80 is disposed on the bonding section 23.

The benefits of the present disclosure are as follows. After bending the bonding section 23 to the back side of the backplane 30, the backplane 30 and the bonding section 23 are adhered by the bonding layer 80 formed by a plurality of adhesive layers which are disposed layer by layer. At the same time, the second adhesive layer 82 in the bonding layer 80 is in an uncured state in a natural environment and has good fluidity. Even if a connection position of the bonding section 23 and the backplane 30 is inaccurate, a bending arc shaped is poor, and the first adhesive layer 81 and the third adhesive layer 83 located at upper and lower layers of the bonding layer 80 may be misaligned after being pressed, so that the position of the bonding section 23 can be moved and adjusted for misalignment compensation, so that the bending arc shaped is good and a product quality is improved.

The above descriptions are merely preferable embodiments of the present disclosure, and are not intended to limit the scope of the present disclosure. Any modification or replacement made by those skilled in the art without departing from the spirit and principle of the present disclosure should fall within the protection scope of the present disclosure. Therefore, the protection scope of the present disclosure is subject to the appended claims.

What is claimed is:

1. A flexible display, comprising:
   a flexible panel comprising a display section, a bonding section, and a bending section between the display section and the bonding section; and
   a backplane disposed on the flexible panel;
   wherein the bonding section is connected to the backplane through a bonding layer in response to the bending section being bent and the bonding section reaching a back side of the backplane, and the bonding layer comprises at least three layers of adhesive layers, and a protective layer is fixedly disposed on the back side of the backplane, and an enhancement layer covering the bending section is disposed on the flexible panel; and
   wherein the bonding layer comprises a first adhesive layer, a second adhesive layer, and a third adhesive layer which are disposed layer by layer, and the first adhesive layer is misaligned with the third adhesive layer.

2. The flexible display as claimed in claim 1, wherein the second adhesive layer comprises a thermosensitive adhesive layer or a photosensitive adhesive layer.

3. The flexible display as claimed in claim 2, wherein the second adhesive layer comprises a first carrier, a second carrier opposite to the first carrier, and a thermosensitive adhesive or a photosensitive adhesive between the first carrier and the second carrier, and the first carrier is disposed on the first adhesive layer, and the second carrier is disposed on the third adhesive layer.

4. The flexible display as claimed in claim 2, wherein the first adhesive layer and the third adhesive layer comprise pressure-sensitive adhesive layers.

5. The flexible display as claimed in claim 1, wherein the bonding layer is disposed below the backplane in response to the flexible panel that is in an unbent state.

6. The flexible display as claimed in claim 1, wherein the bonding layer is disposed on the bonding section in response to the flexible panel that is in an unbent state.

7. The flexible display as claimed in claim 1, wherein the enhancement layer comprises a flexible adhesive layer.

8. The flexible display as claimed in claim 1, wherein the flexible display further comprises:
   an encapsulation layer disposed on the flexible panel;
   a touch layer disposed over the encapsulation layer;
   a polarizer disposed over the touch layer; and
   an encapsulating cover layer disposed on the polarizer;
   wherein the touch layer is electrically connected to the flexible panel through a flexible printed circuit board.

9. A flexible display, comprising:
   a flexible panel comprising a display section, a bonding section, and a bending section between the display section and the bonding section; and
   a backplane disposed on the flexible panel;
   wherein the bonding section is connected to the backplane through an bonding layer in response to the bending section being bent and the bonding section reaching a back side of the backplane, and the bonding layer comprises at least three layers of adhesive layers; and
   wherein the bonding layer comprises a first adhesive layer, a second adhesive layer, and a third adhesive layer which are disposed layer by layer, and the first adhesive layer is misaligned with the third adhesive layer.

10. The flexible display as claimed in claim 9, wherein the second adhesive layer comprises a thermosensitive adhesive layer or a photosensitive adhesive layer.

11. The flexible display as claimed in claim 10, wherein the second adhesive layer comprises a first carrier, a second carrier opposite to the first carrier, and a thermosensitive adhesive or a photosensitive adhesive between the first carrier and the second carrier, and the first carrier is disposed on the first adhesive layer, and the second carrier is disposed on the third adhesive layer.

12. The flexible display as claimed in claim 10, wherein the first adhesive layer and the third adhesive layer comprise pressure-sensitive adhesive layers.

13. The flexible display as claimed in claim 9, wherein the bonding layer is disposed below the backplane in response to the flexible panel that is in an unbent state.

14. The flexible display as claimed in claim 9, wherein the bonding layer is disposed on the bonding section in response to the flexible panel that is in an unbent state.

15. The flexible display as claimed in claim 9, wherein a protective layer is fixedly disposed on the back side of the backplane.

16. The flexible display as claimed in claim 9, wherein an enhancement layer covering the bending section is disposed on the flexible panel.

17. The flexible display as claimed in claim 16, wherein the enhancement layer comprises a flexible adhesive layer.

18. The flexible display as claimed in claim 9, wherein the flexible display further comprises:
- an encapsulation layer disposed on the flexible panel;
- a touch layer disposed over the encapsulation layer;
- a polarizer disposed over the touch layer; and
- an encapsulating cover layer disposed on the polarizer;
- wherein the touch layer is electrically connected to the flexible panel through a flexible printed circuit board.

* * * * *